(12) United States Patent
Laghi

(10) Patent No.: US 7,137,492 B2
(45) Date of Patent: *Nov. 21, 2006

(54) APPARATUS FOR CONTROLLING HYDRAULIC BRAKES IN BICYCLES, MOTORBICYCLES AND THE LIKE

(75) Inventor: Samuele Laghi, Prato (IT)

(73) Assignee: Formula S.R.L., Prato (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/925,272

(22) Filed: Aug. 24, 2004

(65) Prior Publication Data

US 2005/0056508 A1    Mar. 17, 2005

(30) Foreign Application Priority Data

Sep. 15, 2003  (IT)  ............................. FI2003A0241

(51) Int. Cl.
  *B60T 11/00*  (2006.01)
(52) U.S. Cl. ..................... 188/344; 188/151 R; 60/588
(58) Field of Classification Search ................ 188/151, 188/344, 151 R; 60/584, 585, 588, 594; 277/464, 465, 490, 399, 400, 438, 439, 644, 277/647, 908, 928, 929
See application file for complete search history.

(56) References Cited

U.S. PATENT DOCUMENTS

| | | | | |
|---|---|---|---|---|
| 2,878,085 A | * | 3/1959 | Barnhart ..................... 277/438 |
| 4,560,049 A | * | 12/1985 | Uchibaba et al. ........... 188/344 |
| 5,636,518 A | * | 6/1997 | Burgoyne et al. ............ 60/594 |
| 6,003,639 A | * | 12/1999 | Buckley et al. ............. 188/344 |
| 6,318,514 B1 | | 11/2001 | Hinkens et al. |
| 6,804,961 B1 | * | 10/2004 | Lumpkin ..................... 60/588 |
| 2003/0121262 A1 | | 7/2003 | Lumpkin |
| 2003/0121739 A1 | * | 7/2003 | Lumpkin ..................... 188/344 |
| 2003/0183038 A1 | | 10/2003 | Comolti et al. |
| 2005/0056110 A1 | * | 3/2005 | Laghi et al. .................. 74/489 |
| 2005/0115238 A1 | * | 6/2005 | Becocci et al. ............... 60/584 |

FOREIGN PATENT DOCUMENTS

| | | |
|---|---|---|
| DE | 19718612 A1 | 5/1998 |
| EP | 0601769 A1 | 6/1994 |
| EP | 1514757 A1 | 3/2005 |
| EP | 1514791 A1 * | 3/2005 |
| IT | 0218037 | 12/1988 |
| IT | 0218037 | 3/1992 |

* cited by examiner

*Primary Examiner*—Thomas J. Williams
(74) *Attorney, Agent, or Firm*—Ladas & Parry LLP

(57) ABSTRACT

Apparatus for controlling brakes in bicycles and the like, to be used, in particular, for disc brakes mounted on bicycles, with a pump (8) connected with a relevant reservoir (88) for the fluid of the hydraulic circuit, and comprising a piston (89) sliding within a relevant chamber (80) provided with one or more ports (83, 84) for connection with said reservoir (88), said piston being so shaped as to close/open said ports (83, 84) upon its displacement along said chamber (80), the apparatus being characterized in that the idle stroke of the piston (89) inside the said chamber (80) is adjustable by a rotation of the same piston (89) about its longitudinal axis.

16 Claims, 4 Drawing Sheets

APPARATUS FOR CONTROLLING HYDRAULIC BRAKES IN BICYCLES, MOTORBICYCLES AND THE LIKE

The present invention refers to an apparatus for controlling hydraulic brakes in bicycles, motorcycles and the like.

It is known that in a hydraulic disc brake for bicycles or motorcycles, the action exerted on the brake's lever is transmitted to the caliper acting on the disc via a hydraulic connection which exerts on the same caliper a force generated by a pump activated by said lever.

A drawback of the devices which control the hydraulic brakes of known type lies in the relative difficulty of adjusting the idle stroke of the control lever. In fact, in the existing devices, the lever is connected to a piston sliding into a respective chamber exhibited by the pump. In order to adjust the idle stroke of the lever it is currently necessary to move axially the piston with respect to the chamber inside which it slides. This approach is however very complex constructionally and affects negatively the constructional simplicity of the device and its robustness upon use, besides raising the relevant production cost thereof.

A further drawback exhibited by the traditional brake-controlling devices relates to the fact that the reservoir of the brake's pump, usually held in a body of cylindrical shape, is applied to the handlebar, thereby making up an element by itself. This characteristic may result unsuitable inasmuch as it brings about larger dimensions of the handlebar, the said reservoir making up a component that can be damaged by collisions and tampering and being a danger for the user in case of falls.

The main object of the present invention is to provide a brake-controlling apparatus which can be easily adjusted.

A further object of the present invention is to eliminate the drawbacks deriving from the exposure of the reservoirs to possible collisions and/or tampering. This result has been achieved, according to the invention, by adopting the idea of making an apparatus having the characteristics disclosed in the claim 1. Further characteristics being set forth in the dependent claims.

Among the advantages of the present invention there is the fact that no protruding parts are provided which can be damaged or be a danger for the cyclist; that the apparatus has extremely limited overall dimensions and, therefore, gives the handlebar a greater compactness; that a more attractive appearance is conferred to the handlebar; that it is possible to adjust the idle stroke of the lever with greatest ease; that the braking maintains ottimal performance; that the apparatus keeps its characteristics unchanged also after a prolonged service life.

These and other advantages and characteristics of the invention will be best understood by anyone skilled in the art from a reading of the following description in conjunction with the attached drawings given as a practical exemplification of the invention, but not to be considered in a limitative sense, wherein.

Figure 1:
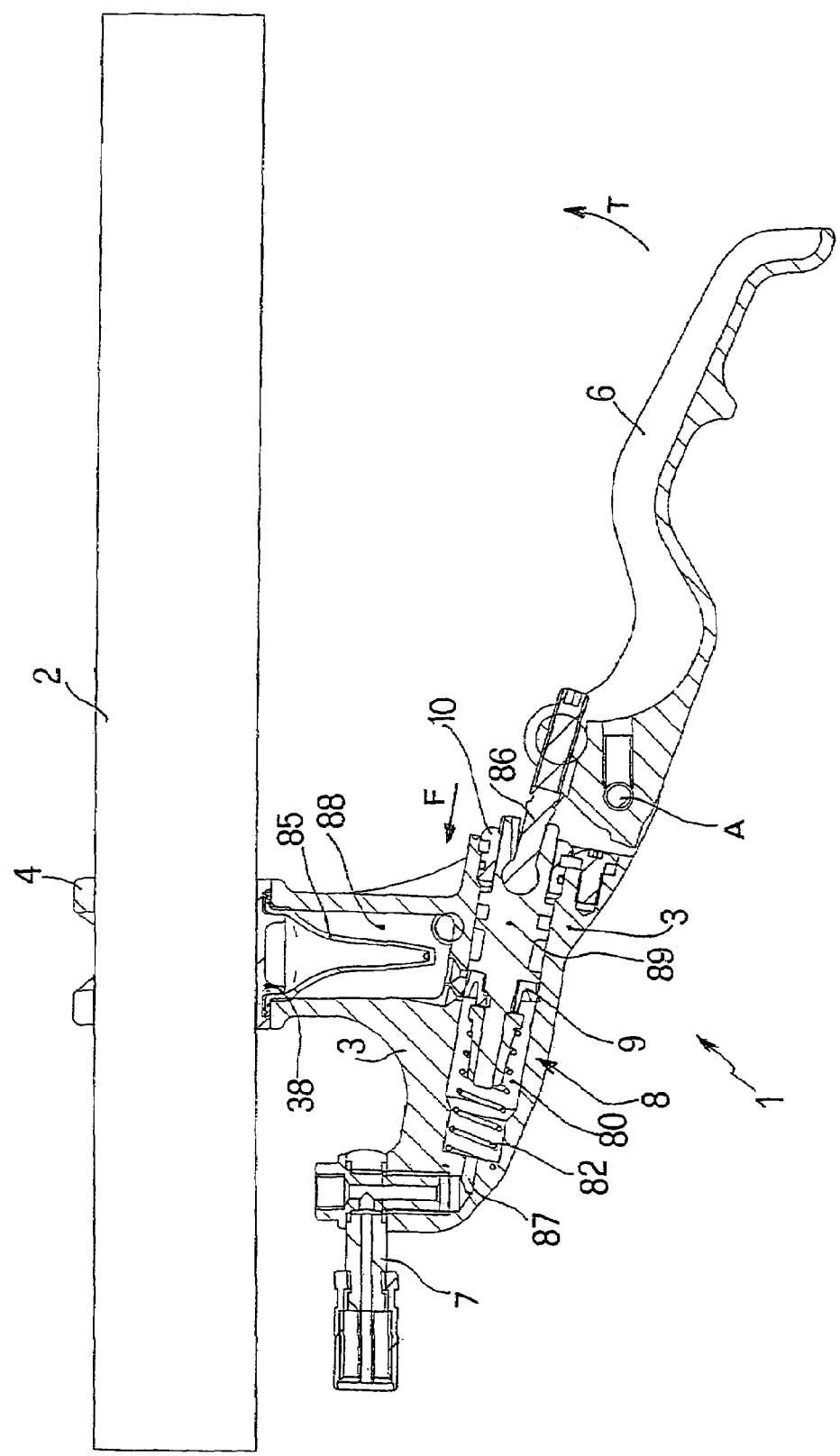
FIG. 1 shows a view in longitudinal section of a possible embodiment of an apparatus for controlling hydraulic brakes according to the invention, in association with a portion of the handlebar.

With reference to the example shown in the attached figures, an apparatus 1 according to the present invention can be associated with a bicycle's handlebar represented in FIG. 1 by a portion of a tubular body 2. The present apparatus comprises a body 3 having concave, substantially semicylindrical surface 30 and so shaped as to be complementary with the profile of the tubular element of the handlebar 2. On the body 3, on either side of said surface 30, there are provided seats 39 for receiving corresponding screws 5 allowing the attachment of the apparatus 1 to the handlebar 2.

The apparatus 1 also comprises a semicollar 4 having a concavity 40 of substantially semicylindrical shape so as to match complementarily with the handlebar 2. Provided on the semicollar 4 are through holes to receive screws 5 for the engagement of the semicollar 4 and the body 3, thereby determining a stable attachment of the apparatus 1 to the handlebar 2.

As best described later on with reference to the example illustrated by the figures of the accompanying drawings, the said body 3 comprises a cavity 88 defining a reservoir for the fluid of the hydraulic circuit. The said reservoir 88 results positioned between the handlebar, to which the body 3 is ensured, and a brake-operating lever 6.

The apparatus 1 further comprises a lever 6 for the operation of the pump acting on the hydraulic circuit of the braking system. The lever 6 is pivoted to the body 3 in correspondence of the axis indicated by A in FIG. 1. In the figures, a conduit 7 can be seen which makes part of the hydraulic circuit and connects the apparatus 1 to the caliper (not shown) acting on the brake's disc. The conduit 7 is connected downstream of a pump 8 to an outlet port 87 through which the fluid is forced into the hydraulic circuit upon activation of the brake. The pump 8 is defined by a chamber 80 within the body 3, and inside which a piston 89 is made to slide. The piston 89 is connected to the lever 6 via a connecting rod 86 having spherical head and located, with respect to the piston, on the side opposite to that in which the port 87 is positioned within the chamber 80. The actuation of the lever 6 (as indicated by the arrow T in FIG. 1) is cause for the displacement of the piston 89 (from the right to the left, with reference to arrow F in FIG. 1) towards the port 87. The return of the piston 89 to the rest position is determined by a spring 82 whose reaction is exerted in a direction opposite to that indicated by arrow F in FIG. 1.

Figure 2:
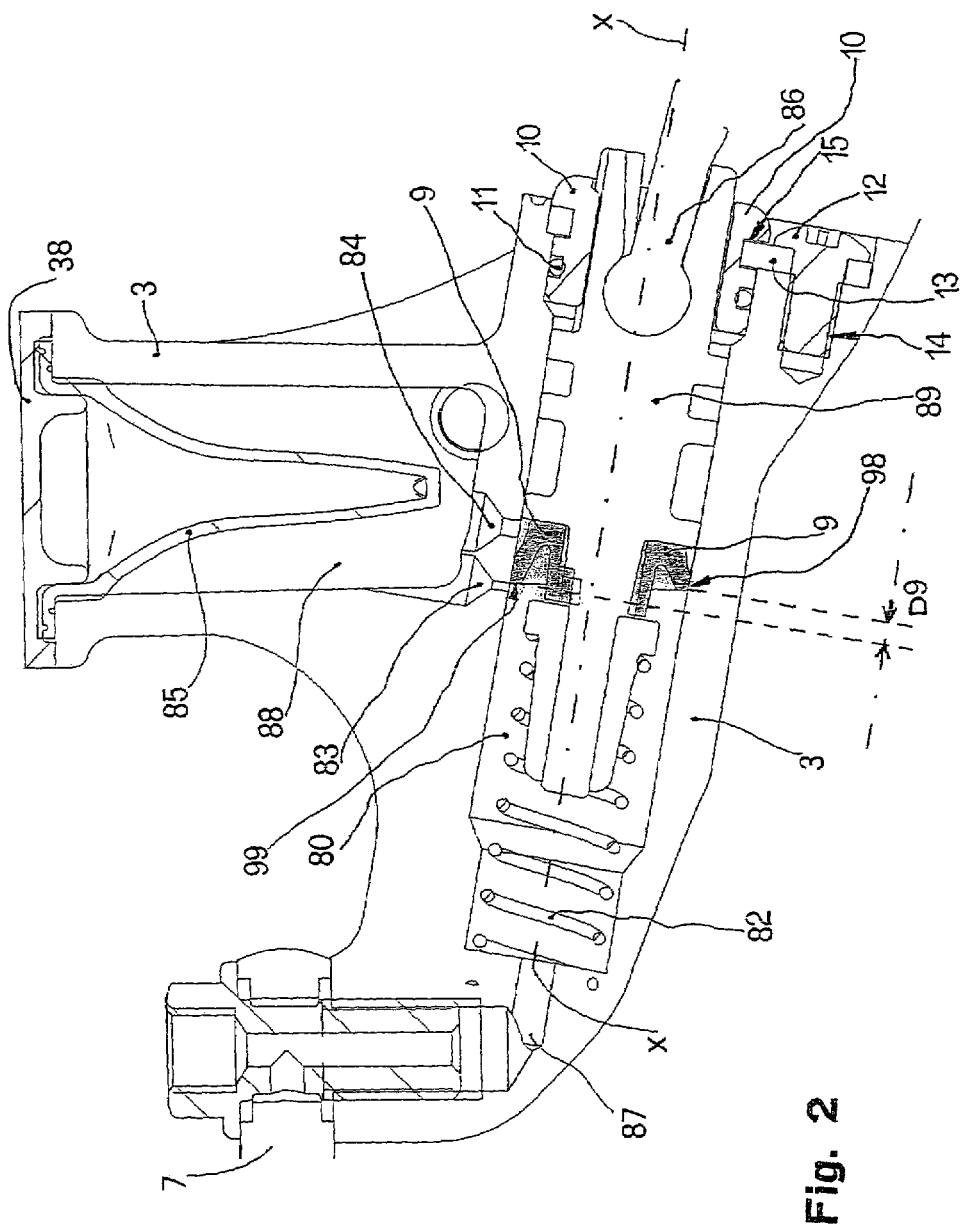
FIG. 2 is an enlarged detail of the embodiment of FIG. 1, in which some lines in the drawing have been omitted for the sake of simplicity.

As best visible in FIG. 2, keeping the piston 89 within the chamber 80 is ensured by the presence of the bush 10 provided with a relevant gasket 11. The bush is fixed to the body 3 of the apparatus by a screw 12. The screw 12 is screwed into a corresponding seat 14 provided in the body 3 and passed through a connecting drilled element 13 which is fitted in a groove 15 formed in the bush 10.

Figure 3:
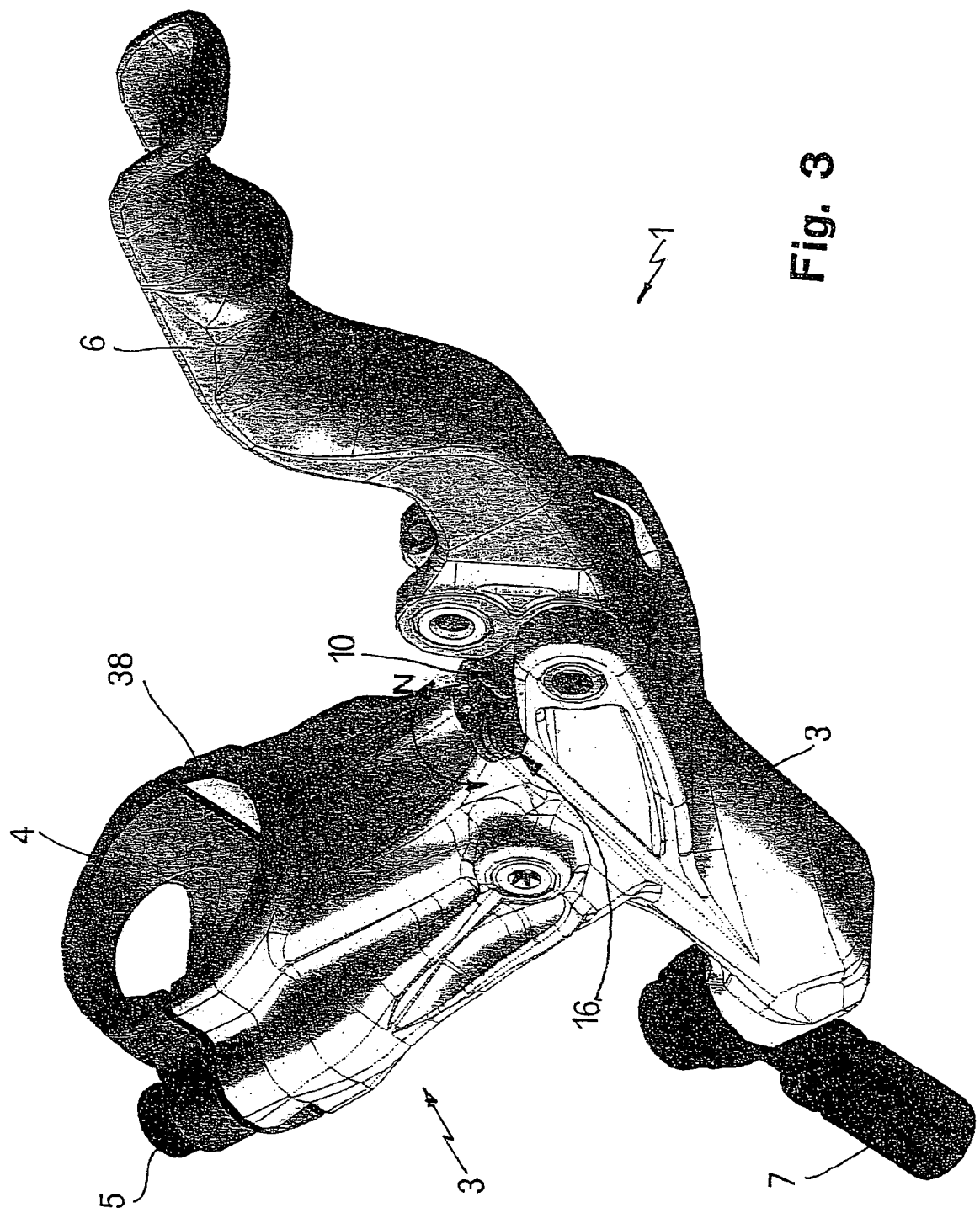
FIG. 3 is a perspective view from below of the apparatus of FIG. 1.
Figure 4:
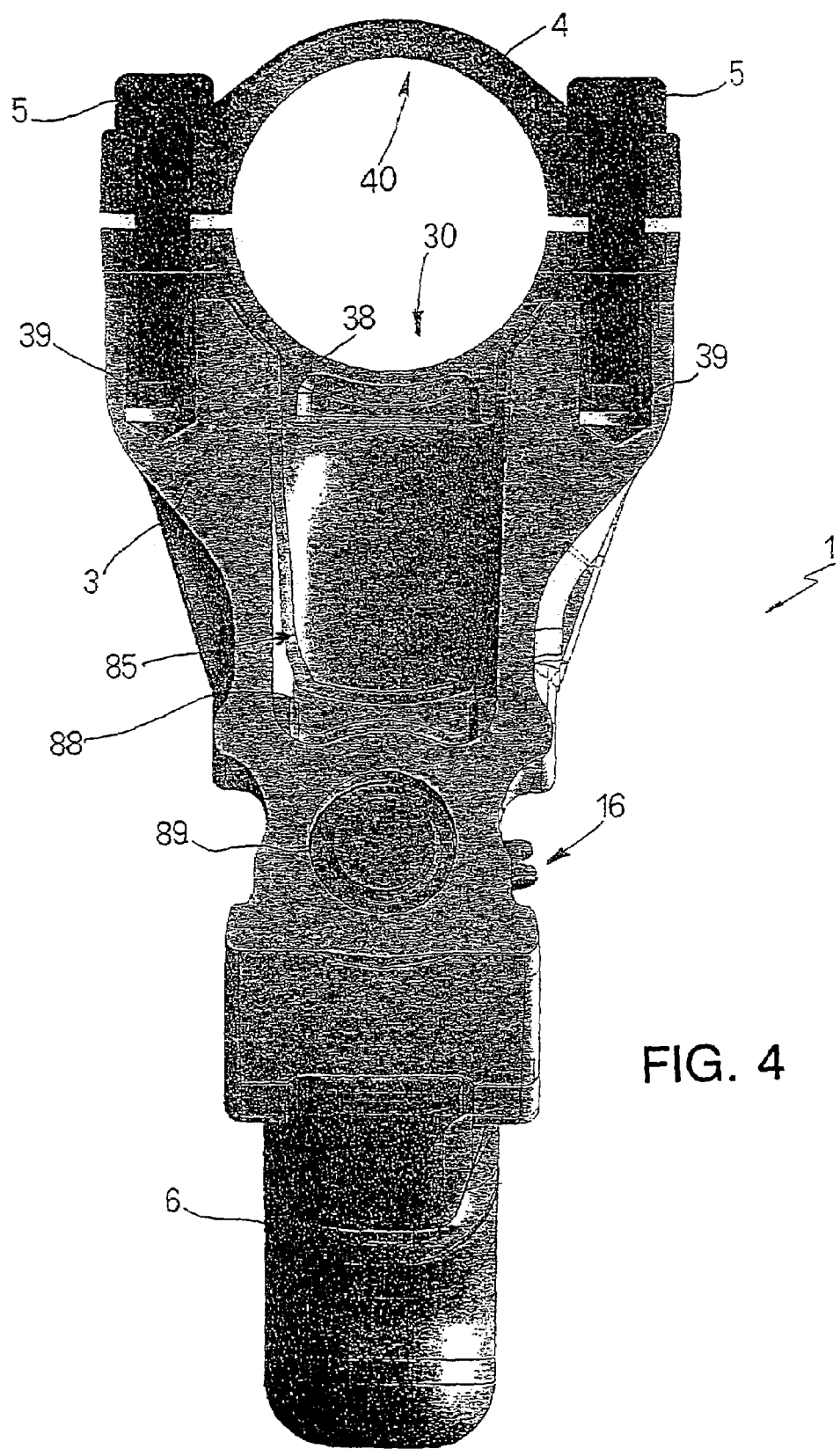
FIG. 4 is a cross-section view of the apparatus of the previsous figures.

The bush 10 is solid to the piston 89 and, for this reason, the piston 89 can rotate together with the bush 10 with respect to the chamber 80. Solid to the bush 10 is a knob 16 (shown in FIGS. 3 and 4) disposed radially to the longitudinal development of the chamber 80, that is, substantially orthogonal to the axis X—X of chamber 80. The rotation of the knob 16 (see arrow N in FIG. 3) causes a corresponding rotation of the piston 89 within the chamber 80.

The chamber 80 is connected with the said reservoir 88 via two ports 83 and 84, which are disposed in a region interested by the piston upon its sliding. Through the ports 83 and 84, in a manner known per se, the fluid is made to pass bidirectionally between the reservoir 88 and the chamber 88 during the axial movement of the piston 89, that is, during the operation of the pump 8. Fitted on the piston 89 is a gasket 9 having circumferential development. The gasket 9 exhibits, along its circumferential profile, a variable extension in the axial direction. In practice, the gasket 9 has a height varying along its longitudinal development. In FIG. 2, D9 indicates the difference in height between the extent of the overlying edge 99, and the corresponding extent of the underlying edge 98. In other words, the plane of said edges 98, 99 forms an acute angle, that is, an angle other than 90°, with said axis X—X.

This particular shaping of the gasket 9 is cause for a different interaction between the piston 89 and the ports 83, 84 of the reservoir 88. Stated differently, the interaction front of the gasket 9 with the ports 83 and 84 is displaced in the axial direction; in practice, by the rotation in one direction or in the opposite direction of piston 89 (obtainable through the knob 16), the gasket 9 closes either in advance or with delay the port 83, that is, before or after the braking command. An adjustment of the idle stroke of the lever 6 is thus obtained with an extremely simple and effective solution.

The reservoir 88 is defined by a corresponding cavity provided in the body 3 of the apparatus 1. Provided inside the reservoir 88 is a traditional, compensating rubber membrane 85. On top, the reservoir is closed by a lid 38. The lid 38 is crossed by screws 5 which fix the apparatus 1 to the handlebar 2.

Moreover, the conformation of the lid 38 is concave so as to complementarily match the profile of handlebar's tube 2.

This characteristic allows accomodating the reservoir 88 in a stable manner over a region protected against collisions and tampering.

Practically, the construction details may vary in any equivalent way as far as the shape, dimensions, elements disposition, nature of the used materials are concerned, without nevertheless departing from the scope of the adopted solution idea and, thereby, remaining within the limits of the protection granted to the present patent.

The invention claimed is:

1. Apparatus for controlling brakes in bicycles, to be used, in particular, for disc brakes mounted on bicycles, with a pump connected with a relevant reservoir for the fluid of the hydraulic circuit, and comprising a piston sliding within a relevant chamber provided with a plurality of ports for connection with said reservoir, said piston being so shaped as to close/open said ports upon its displacement along said chamber, the apparatus being characterized in that the idle stroke of the piston inside said chamber is adjustable by a rotation of the same piston about its longitudinal axis and in which the piston is provided with a gasket able to close said ports upon the stroke of the piston along said chamber, the apparatus being characterized in that said gasket has a circumferential development with differentiated height so as to offer, in correspondence of a rotation of the piston about its longitudinal axis, a different front of interaction with said ports.

2. Apparatus according to claim 1, characterized in that said piston is provided with an operable knob allowing the rotation of the piston relative to the chamber.

3. Apparatus according to claim 1, characterized in that said piston is connected with a lever for the actuation of the pump via a connecting rod having spherical head.

4. Apparatus according to claim 1, characterized in that the reservoir is disposed inside a containment body and exhibits a concave portion complementarily shaped with respect to a portion of the handlebar.

5. Apparatus according to claim 4, characterized in that said concave portion consists of a lid of reservoir.

6. Apparatus according to claim 4, characterized in that said containment body comprises a semicollar having a concavity of a conformation suited for complementarily matching the handlebar on the side opposite to said body.

7. An apparatus according to claim 1, wherein:
said plurality of ports are reservoir ports arranged at a first end of said chamber;
a containment body defines said reservoir, said reservoir ports and said chamber, said containment body also defines an outlet port at a second end of said chamber.

8. An apparatus according to claim 7, wherein said outlet port is arranged with said chamber to always be in communication with a portion of said chamber when said piston is spaced from said second end of said chamber;
said reservoir ports are in communication with said portion of said chamber when said piston is arranged at said first end of said chamber.

9. Apparatus for controlling brakes in bicycles, to be used, in particular, for disc brakes mounted on bicycles, with a pump connected with a relevant reservoir for the fluid of the hydraulic circuit, and comprising a piston sliding within a relevant chamber provided with one or more ports for connection with said reservoir, said piston being so shaped as to close/open said ports upon its displacement along said chamber, the apparatus being characterized in that the idle stroke of the piston inside said chamber is adjustable by a rotation of the same piston about its longitudinal axis;
said reservoir is disposed inside a containment body and exhibits a concave portion complementarily shaped with respect to a portion of the handlebar;
said concave portion includes a lid of said reservoir.

10. A hydraulic master cylinder arrangement comprising:
a body defining a reservoir for fluid and defining a cylinder, said body defining a reservoir port arranged at a first end of said cylinder and forming a fluid passage between said reservoir and said cylinder, said body defining an outlet port at a second end of said cylinder;
a piston movably mounted in said cylinder between said first and second end of said cylinder, said piston also being rotatable in said cylinder about a longitudinal axis of said cylinder;
a gasket mounted on said piston and creating a seal between said piston and said cylinder, said gasket extending in an axial direction of said cylinder, an axial length of said gasket varying along an outer circumference of said gasket, said gasket, said reservoir port and said piston being arranged to have said gasket close said reservoir port to a portion of said cylinder when said piston is spaced from said first end of said cylinder.

11. An arrangement in accordance with claim 10, wherein:
said gasket, said reservoir port and said piston are arranged to have rotation of said piston with said gasket vary an axial position of said piston that closes said reservoir port.

12. An arrangement in accordance with claim 10, wherein:
said outlet port is arranged with said cylinder to always be in communication with said portion of said cylinder when said piston is spaced from said second end of said cylinder;
said reservoir port is in communication with said portion of said cylinder when said piston is arranged at said first end of said cylinder.

13. An arrangement in accordance with claim 10, wherein:
said piston is provided with an operable knob for rotation of said piston relative to said cylinder.

14. An arrangement in accordance with claim 10, further comprising:
a lever pivotally connected to said body, said lever having a first end connected to said piston and a second end for actuation by a user.

15. An arrangement in accordance with claim 10, wherein:
said body defines another reservoir port arranged at said first end of said cylinder and axially spaced from said reservoir port, said another reservoir port forming another fluid passage between said reservoir and said cylinder.

16. An arrangement in accordance with claim 10, wherein:
said gasket, said reservoir port and said piston are arranged to have rotation of said piston with said gasket vary an axial position of said piston that closes said reservoir port;

said outlet port is arranged with said cylinder to always be in communication with said portion of said cylinder when said piston is spaced from said second end of said cylinder;
said reservoir port is in communication with said portion of said cylinder when said piston is arranged at said first end of said cylinder;
said piston is provided with an operable knob for rotation of said piston relative to said cylinder a lever is pivotally connected to said body, said lever having a first end connected to said piston and a second end for actuation by a user;
said body defines another reservoir port arranged at said first end of said cylinder and axially spaced from said reservoir port, said another reservoir port forming another fluid passage between said reservoir and said cylinder.

* * * * *